United States Patent [19]

Barstow

[11] Patent Number: 4,465,315
[45] Date of Patent: Aug. 14, 1984

[54] HINGED WINDSHIELD FOR CYCLES

[76] Inventor: Roger H. Barstow, 146 Kathleen Dr., Attleboro, Mass. 02703

[21] Appl. No.: 342,504

[22] Filed: Jan. 25, 1982

[51] Int. Cl.³ .............................................. B62J 17/04
[52] U.S. Cl. ................................. 296/78.1; 280/287 S
[58] Field of Search ................ 296/78.1, 84 A, 84 H, 296/84 N, 92; 280/289 S

[56] References Cited

U.S. PATENT DOCUMENTS

| 567,860 | 9/1896 | Monaghan | 296/78.1 |
| 1,232,966 | 7/1917 | Pierce | 296/78.1 |
| 1,387,349 | 8/1921 | Campbell | 296/78.1 |
| 1,534,067 | 4/1925 | Owen | 296/78.1 |
| 1,609,590 | 12/1926 | Whidden | 296/92 |
| 2,237,594 | 4/1941 | Dunlap | 296/78.1 |
| 4,066,291 | 1/1978 | Hickman | 296/78.1 |
| 4,087,110 | 5/1978 | Vetter | 280/289 S |

FOREIGN PATENT DOCUMENTS

| 122897 | 10/1926 | Switzerland | 296/78.1 |
| 18811 | of 1898 | United Kingdom | 296/78.1 |
| 139587 | 3/1920 | United Kingdom | 296/78.1 |
| 282227 | 12/1927 | United Kingdom | 296/84 N |
| 400148 | 10/1933 | United Kingdom | 296/84 N |
| 977123 | 12/1964 | United Kingdom | 296/78.1 |

Primary Examiner—Robert B. Reeves
Assistant Examiner—Dennis Pedder
Attorney, Agent, or Firm—Donald W. Meeker

[57] ABSTRACT

A continuous hinge attached to the windshield of a cycle to permit rotation of the windshield from the upright protective position forward and downward to any selected position permitting partial or complete exposure of the rider to the wind. A pair of elongated plates continuously hinged together along one longitudinal edge conform to the shape of the windshield along the opposite edge. Perpendicular flanges along the conforming edge of the hinge secure the hinge to the windshield which is sandwiched between a backplate and the flanges and is separated therefrom by rubber strips. Rotational position of the windshield is provided by selective matching perforations on end plates secured to the ends of the hinge plates or by a notched slidable curved member from one hinge plate secured by a protruding bolt in the other hinge plate. The continuous hinge may be mounted between sections of a windshield, between a windshield and a fairing, or between a windshield and the fork tubes of a cycle by an instantly removable pin and locking sleeve connection.

6 Claims, 6 Drawing Figures

U.S. Patent   Aug. 14, 1984   4,465,315
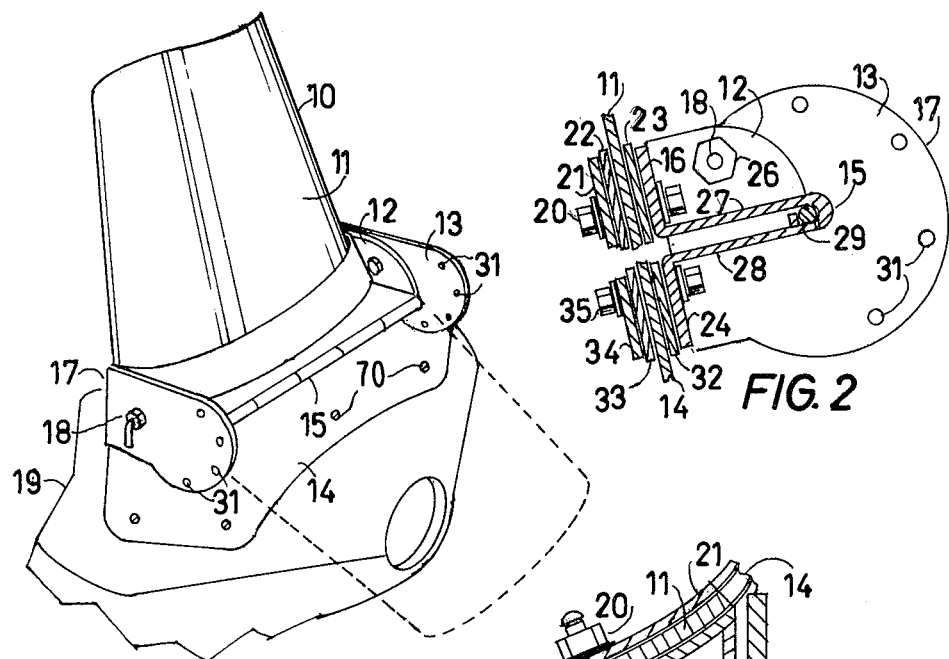
FIG.1
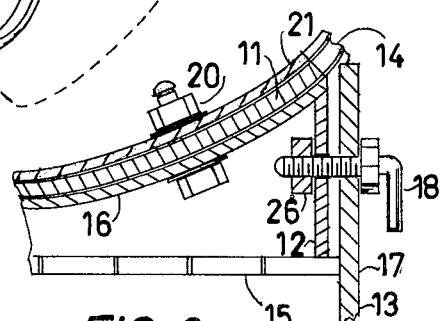
FIG. 2
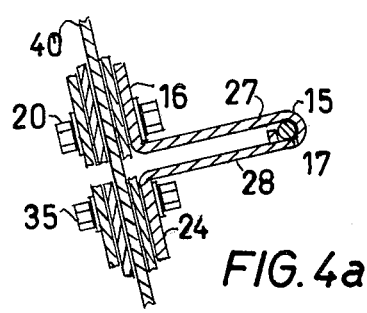
FIG. 3
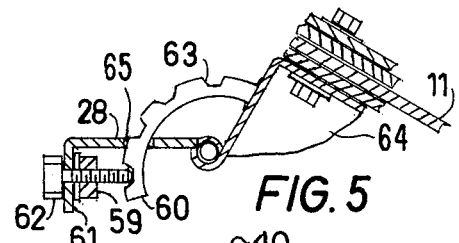
FIG. 5
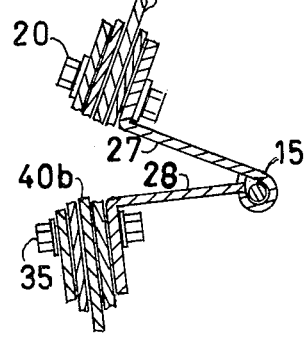
FIG. 4a
FIG. 4b
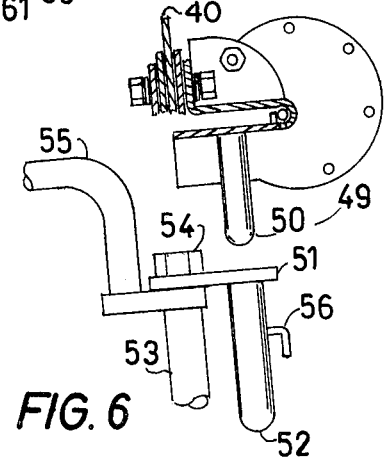
FIG. 6

HINGED WINDSHIELD FOR CYCLES

1. Technical Field

My invention relates to windshields for velocipedes and in particular to windshields which may be reversibly moved into and out of the path of the wind.

2. Background Art

Prior art has demonstrated some collapsible windshields for cycles, but none of the prior art devices provide a system which can readily be applied to an existing windshield, especially a curved windshield.

Many of the prior art foldable windshields provide heavy frame structures which obscure the view of the rider or light material which is not clear for viewing.

None of the prior art devices provide an easily adjustable pivoting windshield which maintains the rider in a wind-free condition. Either they are very small devices or the hinge system permits air to pass through onto the rider.

Most prior art devices are cumbersome and time consuming to install and become permanent fixtures on the cycle.

DISCLOSURE OF THE INVENTION

The present invention provides a hinge system for a folding windshield which may readily be applied to any existing windshield to transform it into a pivoting windshield by securing the hinge plates to the windshield and securing the windshield horizontally in a line between the hinge plates. The curved edges of the plates may be custom-shaped to fit windshields made by any manufacturer.

The present invention provides a simple horizontal hinge and plates located well below the line of vision so that the rider's vision is not obscured by the device. Providing curved edges on the hinge plates the device may readily be applied to clear unobstructed curved windshields.

By providing a continuous hinge across the entire line of separation between windshield sections, no wind may pass between the upper and lower windshield sections. When the windshield is tightly secured to an adequate fairing, no wind hits the rider directly.

Further provided by the present invention is a means to install or remove the foldable windshield instantly within less than a minute.

BRIEF DESCRIPTION OF THE DRAWINGS

These and other details and advantages of my invention will be described in connection with the accompanying drawings, which are furnished only by way of illustration but not in limitation of the invention, and in which:

FIG. 1 is a perspective view of the preferred embodiment of the invention installed on a motorcycle with a fairing;

FIG. 2 is a partial sectional view showing the securing means;

FIG. 3 is a partial plan view of the adjustable connection plates;

FIG. 4a is a partial section elevation view of the invention applied to an existing windshield:

FIG. 4b is a partial section elevational view of the invention applied to an existing windshield after severing the windshield at the hinge;

FIG. 5 is a side elevational view of an alternate embodiment of the means for adjustably securing the windshield in different positions;

FIG. 6 is a side elevational view of an alternate embodiment of the invention being installed on a cycle without a fairing, with an alternate attaching means.

BEST MODE OF CARRYING OUT THE INVENTION

In FIG. 1 the preferred embodiment shows a connecting hinge apparatus 17 having a continuous hinge 15 connecting an upper windshield section 11 to a lower windshield section 14, which is secured and sealed conventionally to a standard fairing 19 of a motorcycle. The fairing is secured to the frame of the motorcycle. While the windshield is in the vertical position (solid lines), the continuous hinge 15 prevents the passage of air between the sections of the windshield. Lower windshield section 14 is securely attached to the fairing by fastening means 70, so that no wind hits the rider directly. Fastening means 70 is a locking nut and bolt means, but alternatively may include welding, riveting, or other joining means.

The hinge 15 permits the rotation of the upper windshield section 11 forward into a lower position (dashed lines) to leave the rider completely exposed to the wind. FIGS. 1 and 2 illustrate one embodiment of the continuous hinge 15, functioning like a piano hinge, the continuous hinge 15 comprises a long pin 29 rotatably connecting an upper plate 27 and a lower plate 28 both fabricated of a rigid material such as sheet metal. The edge of each plate opposite to the hinge conforms to the shape of the windshield. A flange 16 is rigidly secured, by welding for example to the edge of the upper plate 27 and protrudes upwardly therefrom at approximately a right angle. Similarly the edge of the bottom plate 28 conforms to the surface of the windshield and is provided with a flange 24 protruding downwardly therefrom at approximately a right angle. Both flanges 16 and 24 conform to the front surface of the windshield. Back plates 21 and 34 conform to the same size and shape as flanges 16 and 24.

The hinge is positioned against the front surface of the windshield with upper flange aligned with upper windshield section 11 and separated therefrom by a resilient material such as a rubber strip 23, and the lower flange 24 aligned with the lower windshield section 14 and separated therefrom by a resilient material such as a rubber strip 32. On the rear surface of the windshield, opposite the upper flange 16, upper back plate 21 is positioned against the upper windshield section 11 and separated therefrom by a resilient material such as a strip of rubber 22; and, opposite the lower flange 24, lower back plate 34 is positioned against the lower windshield section 14 and separated therefrom by a resilient material such as a rubber strip 33. A series of holes are then drilled along each flange through the flanges, back plates, windshield and rubber strips. Fasteners 20 and 35, such as nuts and bolts are inserted through the holes and tightened to secure the hinge apparatus to the two windshield sections, thereby forming an airtight rotatable connection between the upper and lower windshield sections. Other means such as high strength glue or epoxy might also be used to secure the hinge apparatus to the windshield, possibly without the rubber strips, although the bolts are preferred.

In FIGS. 4a and 4b the connecting hinge apparatus 17 is applied to an existing windshield 40. In FIG. 4a the hinge apparatus 17 is connected to the windshield 40 in the appropriate location by the method described above with the windshield 40 all in one piece. In FIG. 4b, after the hinge apparatus 17 has been secured to the windshield, the windshield is then severed horizontally at a point between the upper and lower plates 27 and 28, thereby forming an upper windshield section 40a and a lower windshield section 40b rotatably connected by a continuous hinge apparatus 17, functioning as described previously with the upper windshield section reversibly rotatable in a forward direction (dashed lines) as in FIG. 1.

In some cycle windshields are attached to fairings by a substantially horizontal connection, the entire windshield may be removed from the fairing and continuous hinge apparatus installed there between securing the entire windshield rotatably to the fairing using the procedure described above with "entire windshield" substituted for "upper windshield section" and "fairing" substituted for "lower windshield section".

For securing the upper windshield in any of a number of selected rotational positions a preferred embodiment in FIGS. 1, 2 and 3 shows each end of the upper plate 27 provided with a small end plate 12 fabricated of a small sheet of rigid material such as metal and secured to the upper plate 27 and upper flange 16 by welding or as an upwardly bent extension of the upper plate itself. Each end plate 12 is provided with an outer edge which curves downward from the flange to a point on the upper plate adjacent to the hinge 15 and further provided with a centrally located hole through the thickness of the end plate. Each end of the lower plate 28 extends slightly beyond the outer face of the upper end plate 12 and is provided with a large end plate 13 fabricated of a larger sheet of rigid material such as metal. Preferably welded to each end of the lower plate 28 and lower flange 24, each large end plate 13 extends vertically from the bottom edge of the lower flange 24 to the top edge of the upper flange 16 and extends in a curved circular shape horizontally forward, beyond the hinge 15 a sufficient distance so that when the upper windshield is rotated forward the hole in the small upper end plate 12 remains within the perimeter of the large lower end plate 13. The faces of the end plates are spaced close together allowing sufficient tolerance to permit one to rotate freely with respect to the other. At least one large lower end plate 13, but preferably both, is provided with a series of spaced perforations 31 adjacent to the forward curved edge and in alignment with the hole of the upper end plate as it is rotated. When the upper windshield section 11 is in the desired rotational position relative to the bottom windshield section 14 and the upper end plate hole is aligned with one of the lower end plate perforations 31, a lock bolt 18 is inserted through both end plates and secured with a nut 26 which may be welded to the inside face of each small upper end plate 12.

In FIG. 5 an alternate embodiment of the adjustable means of securing the upper windshield in position comprises at least one rigid arched member 60 secured to the upper plate and protruding downwardly therefrom. The arched member may form an extension of an upper end plate 64 welded to the upper hinge plate or the arched member itself may be secured to the upper hinge plate as by welding. As the upper windshield section 11 is rotated, the arched member 60 slides reversibly within a slot 65 provided in the lower hinge plate 28. Spaced notches 63 are provided in the outer circumferential edge of the arched member 60. A tab 61 provided with a threaded opening therethrough extends downwardly from the lower hinge plate 28. The threads may be provided by a nut 59 welded to the tab 61. An adjustable protruding member such a a bolt 62 is threaded through the tab opening and into a selected notch of the arched member 60 to secure the upper windshield section 1 in a desired position.

In FIG. 6 an alternate embodiment of the invention provides a hinged windshield apparatus 49 which mounts instantly and removably to one or more fork tubes 53 of a cycle without a fairing. Each fork tube 53 is provided with at least one sleeve 52 in the shape of a rigid elongated cylinder open at the top. Each sleeve 52 is provided with a bracket 51 which is secured to the top of the fork tube by a fastener such as a bolt 54 which may be part of the standard tube structure. Extending downwardly from a continuous hinge apparatus secured to a windshield in the manner previously described, at least one rigid pin 50, secured to the lower hinge plate, may be inserted within a matching sleeve 52 on the cycle and secured therein by an adjustable fastener such as a lock bolt 56 threaded through the sleeve. The windshield 40 thus connected may be pivoted relative to the cycle and locked in a desired poisition as previously described. The windshield and continuous hinge apparatus with pins may be rapidly installed and removed from any cycle provided with matching sleeves.

Thus provided is an adjustably rotating windshield for cycles which may be adapted to fit any cycle with any type of windshield including plexiglass for providing wind protection for the rider as desired.

It is understood that the preceding description is given merely by way of illustration and not in limitation and that various modifications may be made thereto without departing from the spirit of the invention as claimed.

I claim:

1. A hinged windshield for cycles formed by mounting a continuous hinge transversely onto an existing windshield, wherein the hinge is comprised of two rigid plates pivotally connected by a straight pin and the edges of the plates opposite the pin are provided with flanges conforming to the shape of the windshield, so that when the flanges of both plates have been secured to the windshield, the windshield may be severed across the width of the windshield between the two plates to form an upper windshield section and a lower windshield section which pivot relative to one another about the hinge.

2. The invention of claim 1 wherein the lower windshield section is securely attached to and sealed against a fairing on the cycle so that no wind reaches the rider.

3. The invention of claim 1 wherein each plate of the hinge is further provided with an additional perforated plate perpendicular to the pinned plates, the perforated plates are aligned, and a removable connector joins the two plates through matched perforations to provide an adjustable means of securing the windshield in position.

4. The invention of claim 1 wherein an adjustable means of securing the windshield in position comprises:
   a rigid arched member provided with notches and securely attached to the upper plate;
   a slot provided in the lower plate within which slot the arched member slidably and reversably passes;

an adjustable protruding member secured to the bottom plate for reversibly exgaging and disengaging the notches of the arched member.

5. The invention of claim 1 wherein the flanges are provided with spaced openings through which fasteners connect the flanges to other cycle parts and an airtight seal is provided between the flanges and the other cycle parts.

6. The invention of claim 1 further comprising an adjustable means of securing the upper portion of the windshield in an upright position to shield a rider from the wind or forward in a lowered position to expose the rider to the wind or in positions between upright and lowered, partially exposing the rider to the wind.

* * * * *